July 21, 1953 W. C. TROENDLE 2,646,286
BABY CARRIAGE CONVERTIBLE TO A BASSINET
Filed Oct. 11, 1948
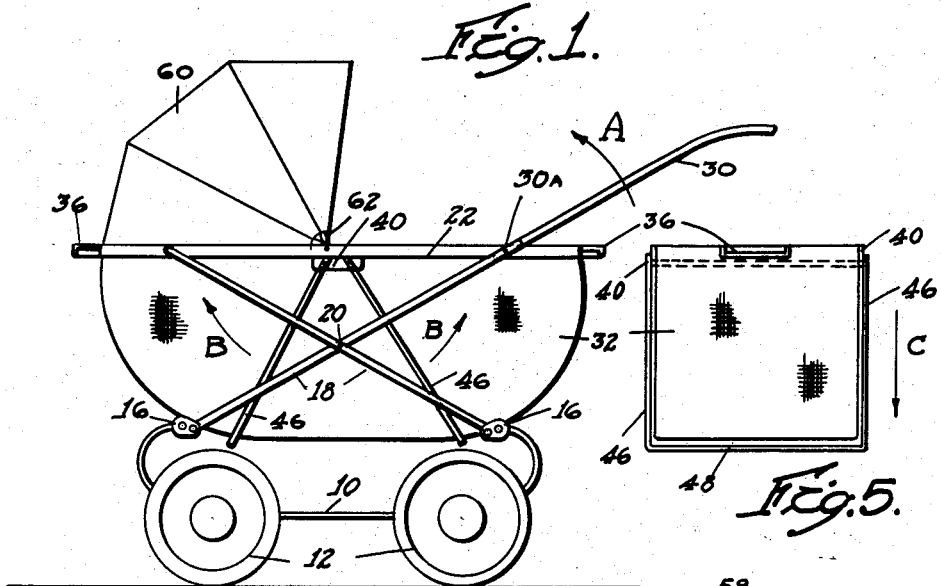
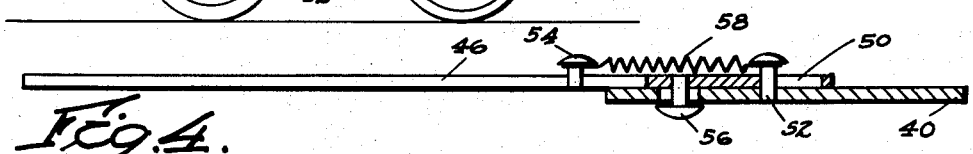
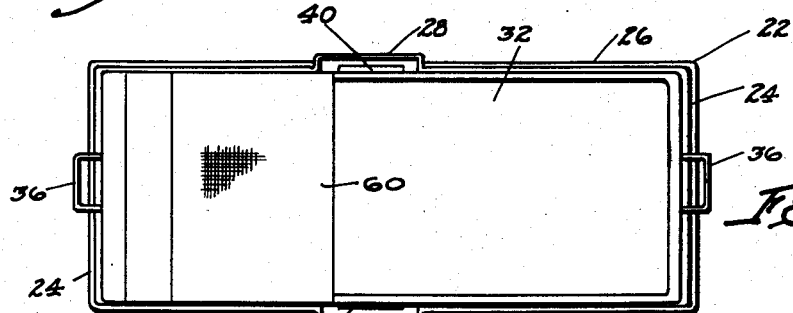
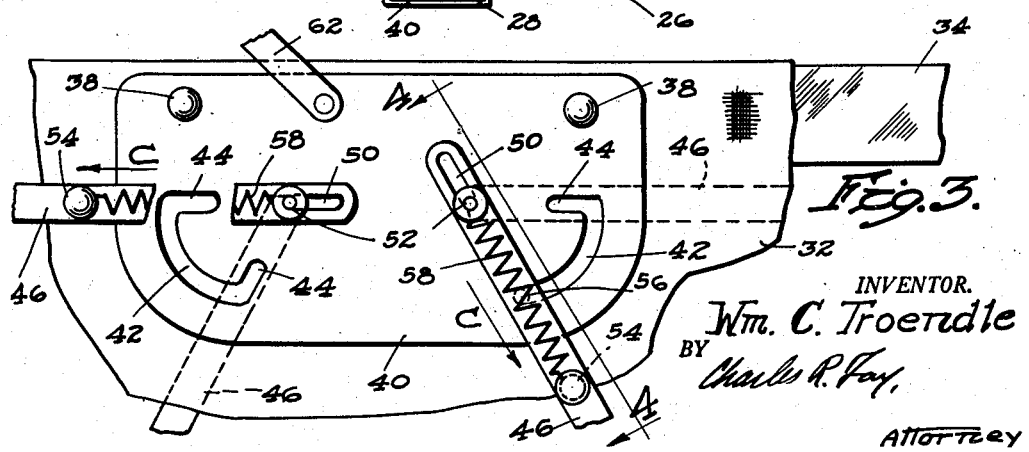
INVENTOR.
Wm. C. Troendle
BY
Charles R. Fay,
ATTORNEY

Patented July 21, 1953

2,646,286

UNITED STATES PATENT OFFICE 2,646,286

BABY CARRIAGE CONVERTIBLE TO A BASSINET

William C. Troendle, Gardner, Mass., assignor to Thayer Company, Gardner, Mass., a corporation of Massachusetts Application October 11, 1948, Serial No. 53,982

3 Claims. (Cl. 280—31)

1

This invention relates to improvements in convertible baby carriages of the type comprising a coach body adapted to be detachably supported upon a wheeled frame, the body being separable from the frame and having a support of its own separate from the wheeled frame, so that it may be set upon any other support, such as a floor, table or bed, or particularly in a seat of an automobile, for use in the general manner of a bassinet.

Further objects of the invention reside in the provision of a folding wheeled frame in combination with a folding baby carriage body, said body having means thereon adapted to be disposed upon parts of the frame for the support of the latter on the former, whereby it is selectively capable of being removed therefrom and used as a bassinet, in combination with a locking plate and pivoted arms thereon, said pivoted arms being movable from out of the way positions which are horizontal, and close to the upper part of the frame of the folding carriage body, to a position at angles thereto, where they depend below the body so as to rest in locked condition upon a support and thus hold the carriage body in useful condition in the absence of the wheeled frame.

Other objects and advantages of the invention will appear hereinafter.

Reference is to be had to the accompanying drawings, in which

Fig. 1 is a view in side elevation of a carriage embodying the present invention;

Fig. 2 is a top plan view thereof, with parts omitted;

Fig. 3 is an enlarged view of the locking mechanism;

Fig. 4 is a section on line 4—4 of Fig. 3; and

Fig. 5 is a view in front elevation of the carriage body.

As shown in Fig. 1, this invention comprises a wheeled frame having a spring support or the like 10 mounted on wheels 12 and supporting as by shackles 16 a conventional scissors frame 18 pivoted at 20 for folding the frame. At the upper ends of the scissors frame, there is provided a fixed rectangular open frame generally indicated at 22 and comprising end elements 24 and side elements 26, the latter being offset at 28 for a purpose to be described. One of the elements of the scissors frame is provided with a folding pusher handle 30 which may be unlocked relative to the scissors frame and pivoted over 30a in the direction of the arrow A in Fig. 1 so as to fold the entire frame, thus far described,

2 bringing the rectangular frame 22 vertically downwardly with the pusher handle 30 disposed thereover in folded condition.

The carriage body is generally indicated at 32 and is preferably of folding construction having an upper rectangular frame 34 supporting the body 32 as by means of a seam or the like. Frame 34 is provided at each end with a handle 36 and these handles are disposable over the end members 24 of the frame 22 to suspend the carriage body 32 within the folding frame so that it hangs down from the open rectangular frame 22. Selectively, however, the carriage body 32 may be lifted by the handles 36 directly upwardly out of the frame 22, so that it will be seen the carriage body is completely, easily and instantly removable from the folding frame 18, 22.

At each side of the carriage body 32 and secured thereto as by pins or rivets 38, there is a locking plate 40. Each of these plates is exactly alike and each one is provided with a pair of through slots 42 which are alike but reversed, see Fig. 3, and are curved on the arc of a circle, terminating in inturned ends 44. For each slot 42, there is a leg 46, the opposite legs 46 at each side of the body 32 being connected as by a member 48 so that actually the pair of locking plates is interconnected by means of two swinging U-shaped elements comprising arms 46 and 48. The free ends of the arms 46 are provided with slots 50 in which are received pivot pins 52 so that the U-shaped elements 46, 48 are pivotable in the directions of the arrows B in Fig. 1, and are also longitudinally movable as indicated by the arrow C in Figs. 3 and 5.

Each arm 46 is provided with a pair of pins 54 and 56, these pins being spaced from each other as clearly shown in Figs. 3 and 4, and extending from opposite sides of the arm 46. The pin 56 extends through its corresponding slot 42 and acts as a locking means in the terminations 44 of the slots. The pins 54 provide a means for anchoring a spring 58 between the arm 46 and the plate 40, see especially Fig. 4.

In the operation of the device, assuming that the arms 46 are in their Fig. 1 position, the carriage may be lifted up out of the frame and set down upon any support desired, so that the carriage body 32, although flexible and foldable, is securely supported by the two U-shaped elements, whether upon a floor, table or seat of an automobile. At any time the carriage body 32 may be replaced with handles 36 resting on end members 24 of the frame 22. However, supposing that it is desired to fold the carriage, the U-shaped members 46, 48 are grasped manually and moved downwardly against the action of the springs 58 so as to remove pins 56 from the terminations 44 that locks it in the Fig. 1 position, and thereupon the U-shaped elements 46, 48 are swung up in the direction of arrows B in Fig. 1, until they are horizontal and the pins 56 snap into the horizontal ends 44 so as to lock the U-shaped supports and allow the baby carriage to be folded in the usual manner.

It will be seen that the handle 30 also provides a convenient means for securing one end of the detached body member to an automobile as by means of a hook or any other means desired. It is also to be noted that the hood 60 is conveniently pivoted by a member 62 to the locking plate 40.

Having thus described my invention and the advantages thereof, I do not wish to be limited to the details herein disclosed, otherwise than as set forth in the claims, but what I claim is:

1. A convertible baby carriage comprising a wheeled frame, a separable carriage body frame, means to suspend detachably the carriage body frame from the wheeled frame, a folding carriage body on the carriage body frame, supports for the carriage body frame to provide for holding the folding carriage body in extended condition when the carriage body and body frame are separate from the wheeled frame, said supports comprising a pair of arms, latch plates on the carriage body frame, each arm being pivoted on a separate pin on each latch plate, means providing for a slight rectilinear motion for said arms on the latch plates, interengaging means on the latch plates and their respective arms to latch the arms selectively in either of two pivoted positions, springs to draw the arms rectilinearly into the latched positions thereof, one of the positions of the arms being along the sides of the carriage frame so that the folding carriage body may be folded, and the other position being an extended position of the arms to provide for extension of the carriage body when the extended arms support the carriage body frame in raised condition.

2. The carriage of claim 1 wherein the interengaging means comprises notched slots in the plates and lugs on the arms in the slots.

3. The carriage of claim 1 wherein the interengaging means comprises a pair of arc-shaped slots in each plate, each slot having a center of curvature coinciding with said pin, a slot in each arm receiving the pin, and inwardly directed notches at the ends of each arc-shaped slot.

WILLIAM C. TROENDLE.

References Cited in the file of this patent

UNITED STATES PATENTS

| Number | Name | Date |
|---|---|---|
| 255,781 | Graeser | Apr. 4, 1882 |
| 886,922 | Baur | May 5, 1908 |
| 1,167,439 | Siebert et al. | Jan. 11, 1916 |
| 1,744,253 | Wedemann | Jan. 21, 1930 |
| 1,869,205 | Mahr | July 26, 1932 |
| 2,399,359 | Kroll et al. | Apr. 30, 1946 |